United States Patent
Kato et al.

(10) Patent No.: US 6,679,809 B2
(45) Date of Patent: Jan. 20, 2004

(54) STEER-BY-WIRE GEAR SHIFTER WITH FORCE FEEDBACK

(75) Inventors: Hironori Kato, Miyagi-ken (JP); Yoshio Sanpei, Miyagi-ken (JP); Noriyuki Fukushima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/212,494

(22) Filed: Aug. 5, 2002

(65) Prior Publication Data

US 2003/0032523 A1 Feb. 13, 2003

(30) Foreign Application Priority Data

Aug. 10, 2001 (JP) .......... 2001-244543

(51) Int. Cl.$^7$ .......... F16H 61/18; F16H 61/24; F16H 59/08
(52) U.S. Cl. .......... 477/115; 74/473.12; 74/473.21
(58) Field of Search .......... 477/115, 125, 477/902; 74/335, 473.12, 473.21, 473.22; 475/132

(56) References Cited

U.S. PATENT DOCUMENTS

| | | | | |
|---|---|---|---|---|
| 4,507,736 A | * | 3/1985 | Klatt | 701/52 |
| 5,035,113 A | * | 7/1991 | Simonyi et al. | 60/390 |
| 5,197,003 A | * | 3/1993 | Moncrief et al. | 434/71 |
| 5,540,114 A | * | 7/1996 | Kim | 74/473.3 |
| 6,508,139 B2 | * | 1/2003 | Onodera | 74/335 |

* cited by examiner

Primary Examiner—Ankur Parekh
(74) Attorney, Agent, or Firm—Brinks Hofer Gilson & Lione

(57) ABSTRACT

A steer-by-wire gear shifter comprises: a holder; a rotary shaft rotatably held by the holder; a shift lever whose bottom is fixed on the rotary shaft; a shift knob attached to a top of the shift lever; detecting means for detecting an operational condition of the shift knob; an actuator which applies an external force for force feedback to the shift knob through the rotary shaft and the shift lever; a control section which receives a detection signal a from the detecting means, a transmission signal d from a transmission controller and an engine revolution speed signal e from an engine controller, generates and outputs a control signal b for the actuator and a gear shift signal c for the transmission controller; and a release switch which unlocks the shift knob.

4 Claims, 4 Drawing Sheets

FIG. 3

| CURRENT SHIFT POSITION | SHIFT KNOB OPERATION | | | | | | SHIFT PATTERN TABLE |
|---|---|---|---|---|---|---|---|
| | P | R | N | D | 2ND | 1ST | |
| P | ○⇌ | × | ○↕ | × | × | × | 8a |
| R | ○ | ○↕ | ○↕ | × | × | × | 8b |
| N | ○ | ⊘↕ | ○↕ | ○↰ | × | × | 8c |
| D | × | × | ○↕ | ○↕ | × | × | 8d |
| 2ND | × | × | × | ○↕ | ⊘↕ | ○↑ | 8e |
| 1ST | × | × | × | ○↰ | ○↕ | × | 8f |
| | × | × | ○↕ | ⊘↕ | ○↕ | ○↕ | 8g |
| | × | × | ○↕ | ⊘↕ | ⊘↕ | ○↕ | 8h |

⊘ : POSITION IN WHICH THE KNOB CAN BE PLACED AGAINST RESISTANCE (CLICKING) WHEN IT IS MOVED FORCIBLY

○ : POSITION IN WHICH THE KNOB CAN BE PLACED

× : POSITION IN WHICH THE KNOB CANNOT BE PLACED

↰, ↱ : MARKS WHICH INDICATE HOW THE KNOB IS GUIDED INTO SPECIFIC POSITIONS

STEER-BY-WIRE GEAR SHIFTER WITH FORCE FEEDBACK

BACKGROUND OF THE INVENTION

1. Field of the Invention

The present invention relates to a steer-by-wire gear shifter and particularly to means for controlling an actuator which applies an external force for force feedback to a shift knob.

2. Description of the Related Art

FIG. 4 shows a conventional steer-by-wire gear shifter as an example.

This gear shifter comprises: a holder 1; a rotary shaft 2 rotatably held by the holder 1; a shift lever 3 whose bottom is fixed on the rotary shaft 2; a shift knob 4 attached to the top of the shift lever 3; a detecting means 5 for detecting the operational condition of the shift knob 4, namely the amount and direction of rotation of the rotary shaft 2; an actuator 6 which applies an external force for force feedback to the shift knob 4 through the rotary shaft 2 and the shift lever 3; a control section 8 which receives detection signal a from the detecting means 5 and generates and outputs a control signal b for the actuator 6 and a gear shift signal c for a transmission controller 7; and a release switch 9 which unlocks the shift knob 4. For the detecting means 5, a rotary encoder or variable resistor may be used; for the actuator 6, a rotary motor, a linear motor or a solenoid may be used.

In this gear shifter, the control section 8 can calculate the current position of the shift knob 4 from the current value of the detection signal a. Also, when an operator operates the shift knob 4, the detection signal a changes, which suggests into which position the shift knob 4 has been shifted. While the shift knob 4 is being moved from one position to another position, the actuator 6 is driven so that an adequate feeling of resistance can be given to the shift knob 4 to create a clicking sensation at the time of gear shift operation. While a driver is attempting to change the position of the shift knob 4 from one specific range to another, for example, from the P (parking) range to the R (reverse) range, or from the 2nd (second) range to the 1st (low) range, it is possible to prevent him/her from changing the position of the shift knob 4 in that way without operating the release switch 9 by activating the actuator 6 so as to apply an external force to lock the shift knob 4.

Therefore, a driver can use this gear shifter as if he/she were using a conventional mechanical gear shifter.

However, the above conventional gear shifter has the following drawback. Since the actuator 6 is controlled according to a detection signal a which depends on the rotational amount and direction of the rotary shaft 2, it is possible to perform a gear shift operation with the shift knob 4 regardless of the vehicle's running condition, transmission operating condition or the like after the driver operates the release switch 9 to unlock the shift knob 4.

This means that even while the engine is running at a high speed, it is possible to change the position of the shift knob 4 from the P range to the R range or to the D (drive) range, or from the D range to the N (neutral) range or to the 1st range and so on. Therefore, unless the driver manipulates the shift knob 4 adequately according to the vehicle's running condition, transmission operating condition or the like, a jack-rabbit start, hard braking, engine idling or other unfavorable situations might occur.

SUMMARY OF THE INVENTION

The present invention has been made to solve the above problem inherent in this prior art; the primary object of the invention is to provide a highly operable and reliable shift knob device which provides the shift knob with an operation feeling which differs depending on the vehicle's running condition and/or transmission operating condition.

In order to solve the above problem, according to one aspect of the present invention, a steer-by-wire gear shifter comprises: a shift knob; an actuator which applies an external force to the shift knob; a control section for the actuator; first detecting means which detects an operational state of the shift knob; and second detecting means which detects a vehicle's running condition and/or its transmission's operating condition, wherein the control section generates a control signal for the actuator based on a first detection signal sent from the first detecting means, referring to a second detection signal sent from the second detecting means, if it decides according to the second detection signal that the shift knob has been properly operated, then it gives the shift knob an adequate external force to enable the shift knob to be shifted, and if it decides according to the second detection signal that the shift knob has been improperly operated, then the shift knob is not held in a shift position selected by a driver but it is shifted into another shift position which is accepted according to the second detection signal.

When the actuator which applies an external force to the shift knob is thus controlled according to the control signal which is generated from the first detection signal sent from the first detecting means for detection of the shift knob's operational state and the second detection signal sent from the second detecting means for detection of the vehicle's running condition and/or its transmission's operating condition, the actuator can be controlled in a way which suits the vehicle's running condition and/or the transmission's operational condition, so that an improper operation of the shift knob can be prevented and therefore the operability and reliability of the steer-by-wire gear shifter can be increased.

According to another aspect of the present invention, the control section incorporates shift pattern tables which specify one or more gear shift positions which can be selected according to the first and second detection signals.

When the control section is thus provided with shift pattern tables as required, it can issue control signals more easily, which reduces the burden on the control section and makes gear shift operation smoother.

BRIEF DESCRIPTION OF THE DRAWINGS

The invention will be more particularly described with reference to the accompanying drawings, in which:

FIG. 3 shows, by example, shift pattern tables which are incorporated in the control section of the gear shifter, according to the embodiment of the present invention.

DETAILED DESCRIPTION OF THE PREFERRED EMBODIMENT

Figure 1:
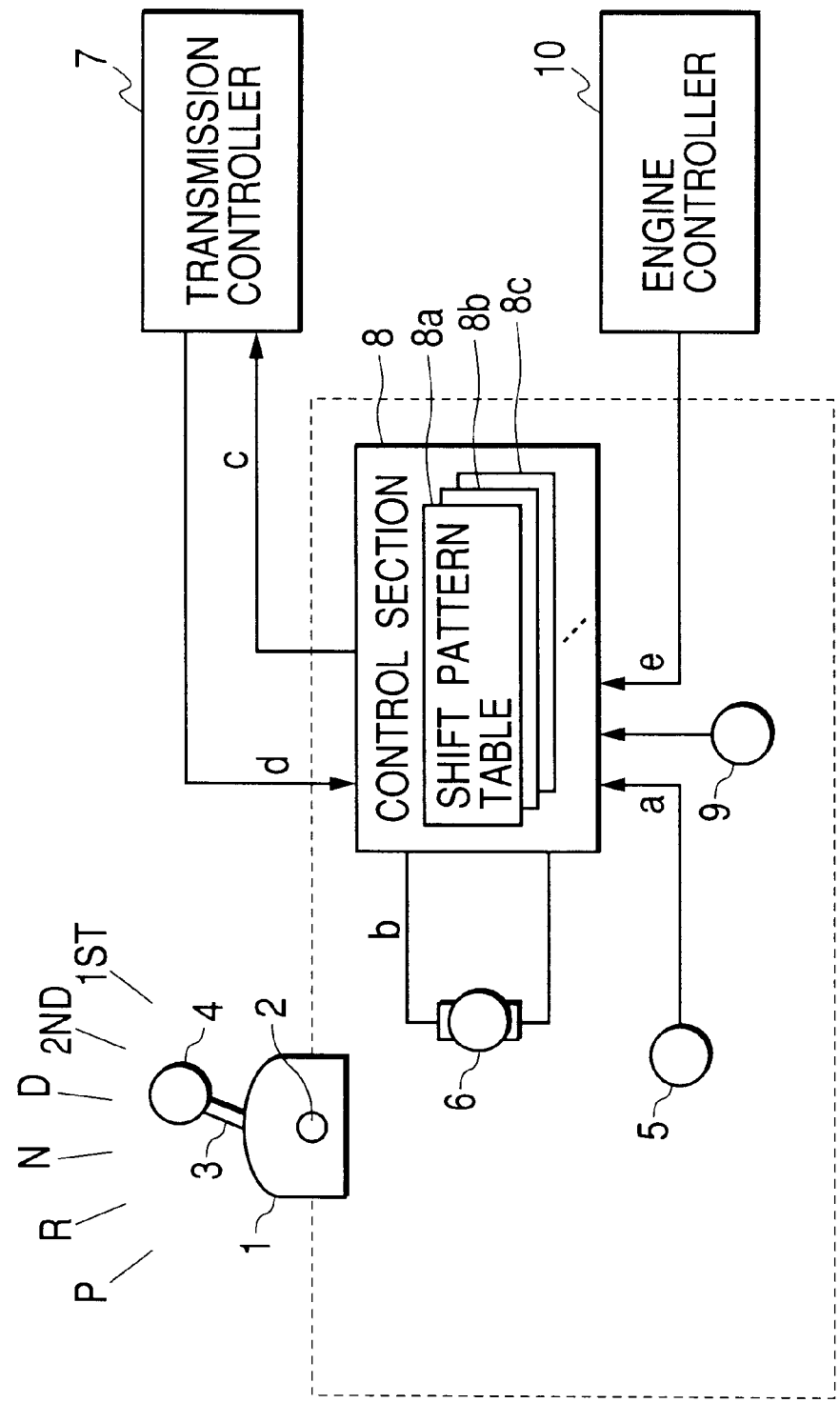
FIG. 1 shows the configuration of a gear shifter according to an embodiment of the present invention.
Figure 2:
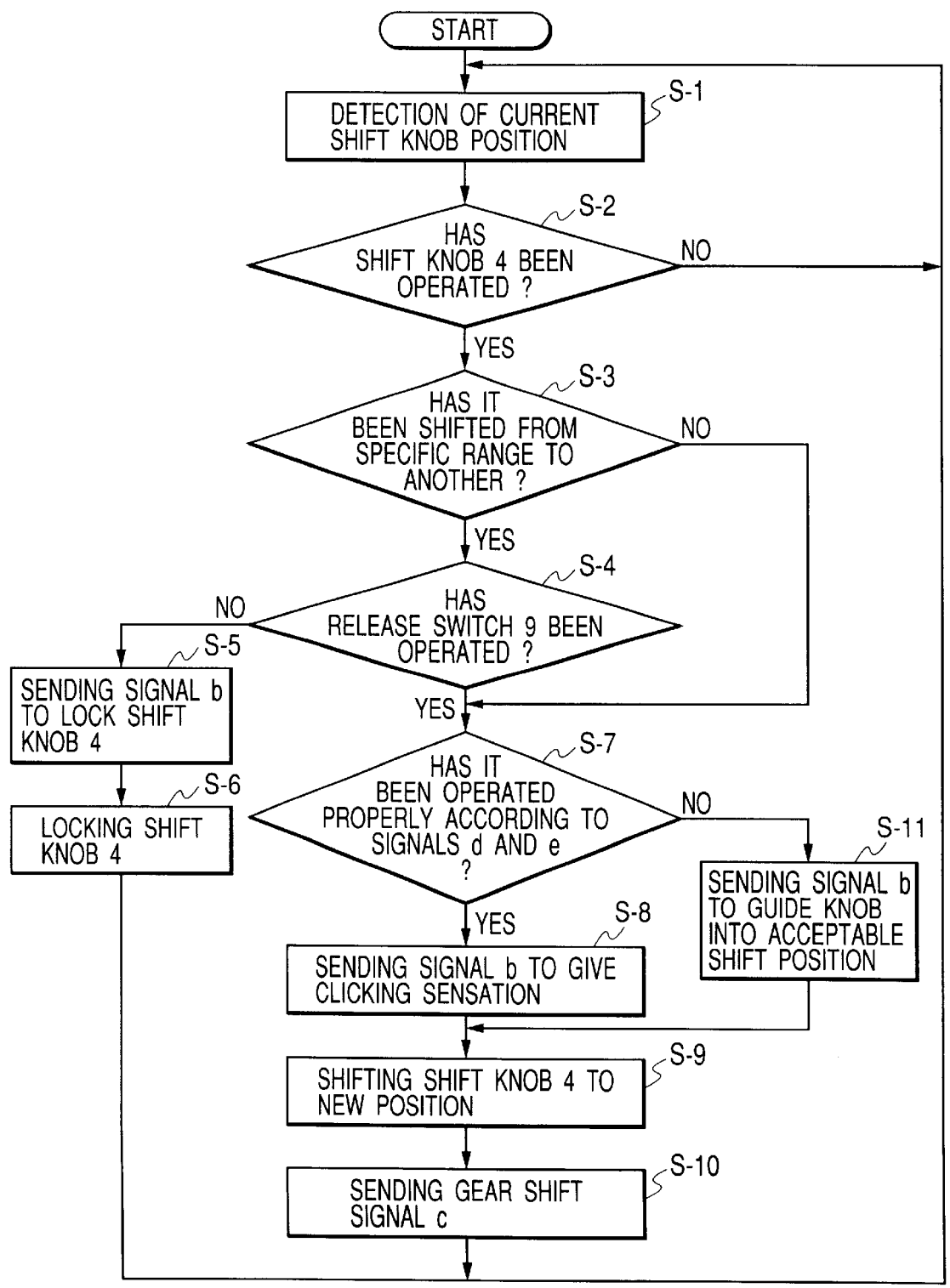
FIG. 2 is a flowchart showing the control operation sequence for the gear shifter according to the embodiment of the present invention.

Next, a gear shifter according to a preferred embodiment of the present invention will be described referring to FIG. 1 to FIG. 3. FIG. 1 shows the configuration of a gear shifter according to an embodiment of the present invention; FIG. 2 is a flowchart showing the control operation sequence for the gear shifter according to the embodiment of the present invention; and FIG. 3 shows, by example, shift pattern tables.

Figure 4:
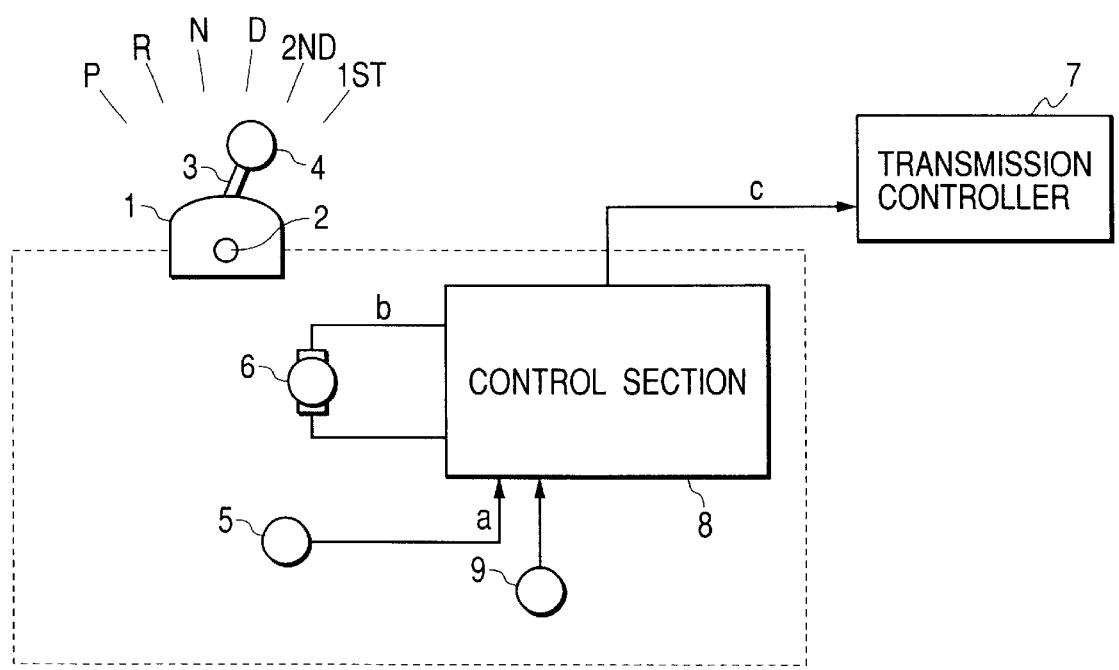
FIG. 4 shows the configuration of a conventional gear shifter.

As illustrated in FIG. 1, in the gear shifter according to this embodiment, a control section 8 receives not only a detection signal a from detecting means 5 but also a transmission signal d (for example, a transmission output shaft revolution speed signal or transmission gear shift position signal) from a transmission controller 7 and an engine revolution speed signal e from an engine controller 10; and according to these signals a, d, and e, it generates an actuator control signal b and a gear shift signal c; and it also incorporates shift pattern tables 8a to 8h as illustrated in FIG. 3. The other components are the same as those shown in FIG. 4, so they are designated with the same reference numerals and their description is omitted here.

As illustrated in FIG. 2, the control section 8 repeatedly checks the current value of the detection signal a to detect the current position of the shift knob 4 (steps S-1, S-2).

If it is found at step S-2 that the driver has operated the shift knob 4, the control section 8 proceeds to step S-3 where it decides whether or not the shift knob 4 has been shifted from a specific range to another specific range (for example, from the P range to the R range, or from 2nd range to the 1st range).

If it is decided at step S-3 that the shift knob 4 has been shifted from a specific range to another specific range, it proceeds to step S-4 where it decides whether or not the driver has operated the release switch 9.

If it is decided at step S-4 that the driver has not operated the release switch 9, the control section 8 issues an actuator control signal b for applying to the shift knob 4 an external force which can lock the shift knob 4 (step S-5) and locks the shift knob 4 (step S-6). This prevents a careless operation of the shift knob 4, eliminating the possibility of jack-rabbit starts or hard braking.

If it is decided at step S-4 that the release switch 9 has been operated, it proceeds to step S-7 where according to the transmission signal d from the transmission controller 7 and the engine revolution speed signal e from the engine controller 10, it decides whether or not the shift knob 4 has been operated properly. Here, the control section 8 selects a suitable shift pattern table depending on the signals a, d and e and the selected shift pattern table is used to decide whether or not the shift knob 4 has been operated properly.

If it is decided at step S-7 that the shift knob 4 has been operated properly, the control section 8 gives the actuator 6 an actuator control signal b to provide the shift knob 4 with an appropriate feeling of resistance (step S-8) and puts the shift knob 4 into a new position (step S-9). This gives the shift knob 4 a clicking sensation each time gear shift operation is done, resulting in improvement in the operability of the shift knob 4.

After the shift knob 4 has been put into the new position at step S-9, the control section 8 sends the transmission controller 7 a gear shift signal c matched to the new position of the shift knob 4 (step S-10). As a consequence, the transmission (not shown) is placed in a new gear position which enables the driver to drive the vehicle properly.

If at step S-7 it is decided according to the transmission signal d and engine revolution speed signal e that the shift knob 4 has not been operated properly, then the control section 8 sends the actuator 6 an actuator control signal b which guides the shift knob 4 not into its actually selected position but into an acceptable or expected position according to the transmission signal d and engine revolution speed signal e (step S-11) and then proceeds to step S-9 where the shift knob 4 is shifted into a new shift position. The control section 8 sends the transmission controller 7 a gear shift signal c matched to the new shift position of the shift knob 4 (step S-10).

For instance, if the driver attempts to change the position of the shift knob 4 from the P range to the R range while the engine is running at a high speed, as indicated by a shift pattern table 8a in FIG. 3, the shift knob 4 is guided into the N range, skipping the R range, or guided back into the P range. On the other hand, if the driver attempts to change the position of the shift knob 4 from the N range to the D range while the engine is running at a high speed, as indicated by a shift pattern table 8d in FIG. 3, the shift knob 4 is guided back into the N range regardless of the driver's shift operation. This prevents a jack-rabbit start or engine idling in the vehicle.

If the driver attempts to change the position of the shift knob 4 from the D range to the 1st range while the transmission output shaft is revolving at a high speed, as indicated by a shift pattern table 8f in FIG. 3, the shift knob 4 is guided into the 2nd range or guided back into the D range. This prevents hard braking in the vehicle.

If the driver attempts to change the position of the shift knob 4 from the D range to the N range during driving, as indicated by a shift pattern table 8f in FIG. 3, the shift knob 4 is guided into the 2nd range or guided back into the D range. This prevents the engine from idling.

In the above embodiment, both the transmission signal d and the engine revolution speed signal e are sent to the control section 8. However, it is also acceptable to send only one of these signals to the control section 8.

In the above embodiment, the force feedback function of the gear shifter is used to give the shift knob 4 a clicking sensation at the time of gear shift operation, and to lock the shift knob 4 when an attempt is made to move it from one specific range to another specific range. However, in this arrangement, while an attempt to move the shift knob 4 to a specific range is continuing, power must be continuously supplied to the actuator 6, resulting in an increase in power consumption. To avoid this problem, the force feedback function of the gear shifter may be used only to give shift knob 4 a clicking sensation and some mechanical means for locking it may be used when an attempt is made to move it from one specific range to another.

As is apparent from the above explanation, according to the present invention, the actuator which applies an external force to the shift knob is controlled according to the control signal which is generated from the first detection signal sent from the first detecting means for detection of the shift knob's operational state and the second detection signal sent from the second detecting means for detection of the vehicle's running condition and/or the transmission's operating condition; therefore, the actuator can be controlled in a way which suits the vehicle's running condition and/or the transmission's operational condition so that an improper operation of the shift knob by the driver can be prevented and thus the operability and reliability of the steer-by-wire gear shifter can be increased.

What is claimed is:
1. A steer-by-wire gear shifter comprising:
a shift knob;
an actuator which applies an external force to the shift knob;

a control section that controls the actuator;

first detecting means which detects an operational state of the shift knob; and second detecting means which detects one of a vehicle's running condition and a transmission's operating condition, wherein the control section generates a control signal that is transmitted to the actuator based on a first detection signal sent from the first detecting means, referring to a second detection signal sent from the second detecting means, wherein if the control section decides according to the second detection signal that the shift knob has been properly operated, then the control section gives the shift knob an adequate external force to enable the shift knob to be shifted into a next position, and wherein if the control section decides according to the second detection signal that the shift knob has been improperly operated, then the shift knob is not held in a shift position selected by a driver but the shift knob is shifted into another shift position which is accepted according to the second detection signal.

2. The steer-by-wire gear shifter according to claim 1, wherein the control section incorporates shift pattern tables which specify at least one gear shift positions which can be selected according to the first and second detection signals.

3. A steer-by-wire gear shifter comprising:

a shift knob;

an actuator which applies an external force to the shift knob;

a control section that controls the actuator;

a first detector which detects an operational state of the shift knob; and a second detector which detects one of a vehicle's running condition and a transmission's operating condition, wherein the control section generates a control signal that is transmitted to the actuator based on a first detection signal sent from the first detector, referring to a second detection signal sent from the second detector, wherein if the control section decides according to the second detection signal that the shift knob has been properly operated, then the control section gives the shift knob an adequate external force to enable the shift knob to be shifted into a next position, and wherein if the control section decides according to the second detection signal that the shift knob has been improperly operated, then the shift knob is not held in a shift position selected by a driver but the shift knob is shifted into another shift position which is accepted according to the second detection signal.

4. The steer-by-wire gear shifter according to claim 3, wherein the control section incorporates shift pattern tables which specify at least one gear shift positions which can be selected according to the first and second detection signals.

* * * * *